US010521601B2

(12) United States Patent
Peretz et al.

(10) Patent No.: US 10,521,601 B2
(45) Date of Patent: Dec. 31, 2019

(54) SYSTEM AND METHOD FOR DATA GOVERNANCE (71) Applicant: Sailpoint Technologies, Israel Ltd., Ramat Gan (IL)

(72) Inventors: Roy Peretz, Petach Tikva (IL); Maor Goldberg, Sunnyvale, CA (US); Eran Leib, Modi'in (IL); Shlomi Wexler, Tel Aviv (IL); Itay Maichel, Ra'anana (IL); Aviad Chen, Kfar Saba (IL)

(73) Assignee: Sailpoint Technologies, Israel Ltd., Ramat Gan (IL)

( * ) Notice: Subject to any disclaimer, the term of this patent is extended or adjusted under 35 U.S.C. 154(b) by 0 days.

(21) Appl. No.: 14/672,241

(22) Filed: Mar. 30, 2015

(65) Prior Publication Data
US 2015/0317485 A1 Nov. 5, 2015

Related U.S. Application Data (60) Provisional application No. 61/986,129, filed on Apr. 30, 2014.

(51) Int. Cl.
*G06F 21/62* (2013.01)
*G06F 21/60* (2013.01)

(52) U.S. Cl.
CPC ........ *G06F 21/6218* (2013.01); *G06F 21/604* (2013.01); *G06F 21/62* (2013.01)

(58) Field of Classification Search
CPC ...................................... G06F 21/62
USPC ........................................... 726/28
See application file for complete search history.

(56) References Cited

U.S. PATENT DOCUMENTS

| 4,979,118 A | 12/1990 | Kheradpir |
| 5,553,235 A | 9/1996 | Chen et al. |
| 5,557,747 A | 9/1996 | Rogers et al. |
| 5,889,953 A | 3/1999 | Thebaut et al. |
| 5,911,143 A | 6/1999 | Deinhart et al. |
| 5,920,622 A * | 7/1999 | Erb ......................... G06F 9/468 370/261 |
| 5,982,369 A | 11/1999 | Sciammarella et al. |
| 5,999,911 A | 12/1999 | Berg et al. |

(Continued)

FOREIGN PATENT DOCUMENTS

| GB | 2458568 A * | 9/2009 | ............. G06F 21/10 |
| GB | 2458568 A * | 9/2009 | ............. G06F 21/10 |
| JP | 2001086152 | 3/2001 | |

OTHER PUBLICATIONS

Non-Final Office Action dated May 8, 2008 in related U.S. Appl. No. 10/735,087 entitled "Method for Tracking the Status of Workflow Using Weblogs".

(Continued)

*Primary Examiner* — Peter C Shaw
(74) *Attorney, Agent, or Firm* — Heidi Brun Associates Ltd.

(57) ABSTRACT

A system for determining information about a resource. The system includes a profiler to generate a targeted subset of users for at least one selected resource according to at least one of: a pre-defined goal and usage statistics of the resource with respect to the goal; an addresser to request from the subset of users information regarding the goal and a collector to collect and analyze the information and to update attributes of the resource according to the information.

4 Claims, 4 Drawing Sheets

(56) References Cited

U.S. PATENT DOCUMENTS

| | | | |
|---|---|---|---|
| 6,088,679 | A | 7/2000 | Barkley |
| 6,088,767 | A * | 7/2000 | Dan ..................... G06F 12/122 707/999.001 |
| 6,167,445 | A | 12/2000 | Gai et al. |
| 6,170,015 | B1 | 1/2001 | Lavian |
| 6,202,066 | B1 | 3/2001 | Barkley et al. |
| 6,412,000 | B1 | 6/2002 | Riddle et al. |
| 6,453,353 | B1 | 9/2002 | Win et al. |
| 6,460,141 | B1 | 10/2002 | Olden |
| 6,484,261 | B1 | 11/2002 | Wiegel |
| 6,539,404 | B1 | 3/2003 | Ouchi |
| 6,615,199 | B1 | 9/2003 | Bowman-Amuah |
| 6,651,033 | B2 | 11/2003 | Nemoto et al. |
| 6,823,513 | B1 | 11/2004 | McNally et al. |
| 6,947,989 | B2 | 9/2005 | Gullotta et al. |
| 6,968,343 | B2 | 11/2005 | Charisius et al. |
| 7,027,997 | B1 | 4/2006 | Robinson et al. |
| 7,062,449 | B1 | 6/2006 | Clark |
| 7,069,003 | B2 | 6/2006 | Lehikoinen et al. |
| 7,308,702 | B1 | 12/2007 | Thomsen et al. |
| 7,546,346 | B2 | 6/2009 | Ouchi |
| 7,653,692 | B2 | 1/2010 | Creamer et al. |
| 7,844,492 | B2 | 11/2010 | Perkowski et al. |
| 8,140,691 | B2 | 3/2012 | Kogan et al. |
| 8,386,272 | B2 | 2/2013 | Kaminsky et al. |
| 2001/0044841 | A1 | 11/2001 | Kosugi et al. |
| 2002/0010741 | A1 | 1/2002 | Stewart et al. |
| 2002/0049627 | A1 | 4/2002 | Goli et al. |
| 2002/0070953 | A1 | 6/2002 | Barg et al. |
| 2002/0087679 | A1 | 7/2002 | Pulley et al. |
| 2002/0099701 | A1 | 7/2002 | Rippich |
| 2002/0103797 | A1 | 8/2002 | Goel et al. |
| 2002/0107958 | A1 | 8/2002 | Faraldo, II |
| 2002/0152254 | A1 | 10/2002 | Teng |
| 2002/0161706 | A1 | 10/2002 | Brinskele et al. |
| 2002/0174087 | A1 | 10/2002 | Hao et al. |
| 2003/0018508 | A1 | 1/2003 | Schwanke |
| 2003/0018702 | A1 | 1/2003 | Broughton et al. |
| 2003/0023675 | A1 | 1/2003 | Ouchi et al. |
| 2003/0041131 | A1 | 2/2003 | Westerinen et al. |
| 2003/0046134 | A1 | 3/2003 | Frolick et al. |
| 2003/0051033 | A1 | 3/2003 | Kusumoto et al. |
| 2003/0061266 | A1 | 3/2003 | Ouchi |
| 2003/0110249 | A1 | 6/2003 | Buus et al. |
| 2003/0135565 | A1 | 7/2003 | Estrada |
| 2003/0144868 | A1 | 7/2003 | MacIntyre et al. |
| 2003/0187719 | A1 | 10/2003 | Brocklebank |
| 2003/0217056 | A1* | 11/2003 | Allen ..................... G06F 16/9535 |
| 2004/0002950 | A1 | 1/2004 | Brennan et al. |
| 2004/0015821 | A1 | 1/2004 | Lu et al. |
| 2004/0019799 | A1 | 1/2004 | Vering et al. |
| 2004/0054690 | A1 | 3/2004 | Hillerbrand et al. |
| 2004/0162906 | A1 | 8/2004 | Griffin et al. |
| 2004/0199734 | A1* | 10/2004 | Rajamani ................. G06F 9/524 711/163 |
| 2004/0230989 | A1* | 11/2004 | Macey ................ G06F 17/2705 725/24 |
| 2005/0027651 | A1 | 2/2005 | DeVault et al. |
| 2005/0033777 | A1 | 2/2005 | Moraes et al. |
| 2005/0114347 | A1 | 5/2005 | Wesinger et al. |
| 2005/0131750 | A1 | 6/2005 | Kogan et al. |
| 2005/0182773 | A1 | 8/2005 | Feinsmith |
| 2005/0246193 | A1 | 11/2005 | Roever et al. |
| 2005/0257158 | A1 | 11/2005 | Lombardo |
| 2005/0289163 | A1 | 12/2005 | Gordon et al. |
| 2006/0004691 | A1 | 1/2006 | Sifry |
| 2006/0122876 | A1 | 6/2006 | Von Schweber et al. |
| 2006/0173985 | A1 | 8/2006 | Moore |
| 2006/0277089 | A1 | 12/2006 | Hubbard et al. |
| 2007/0094076 | A1 | 4/2007 | Perkowski et al. |
| 2007/0208946 | A1* | 9/2007 | Baby ..................... G06F 12/0875 713/182 |
| 2007/0250478 | A1 | 10/2007 | Copperman |
| 2007/0250492 | A1 | 10/2007 | Angel et al. |
| 2009/0222901 | A1* | 9/2009 | Schneider ............... G06F 21/33 726/10 |
| 2012/0158949 | A1* | 6/2012 | Lee ..................... H04L 41/0896 709/224 |
| 2012/0254053 | A1* | 10/2012 | Joa ..................... G06F 17/30303 705/319 |
| 2014/0171115 | A1* | 6/2014 | LaMarca ................. G06F 17/30 455/456.3 |

OTHER PUBLICATIONS

Agnew, Marion, "Collaboration on the Desktop", InformationWeek, Jul. 10, 2000, 6 pages.

White, Martin, "CMS Implementation—Project Management", EContent, vol. 25, No. 11, Nov. 2002, 3 pages.

Gillmor, Dan, "RSS Starting to Catch on", Computerworld, vol. 37, No. 30, Jul. 28, 2003, 2 pages.

Arnold, Stephen E., "Social Software", Searcher, vol. 11, No. 9, Oct. 2003. This document is cited in U.S. Appl. No. 10/735,087 and is available at the USPTO. Copies of this document are therefore not believed to be required with submission of the IDS.

Vu, Uyen, "How Online Diaries Change Knowledge Management", Canadian HR Reporter, vol. 16, No. 18, Oct. 20, 2003. This document is cited in U.S. Appl. No. 10/735,087 and is available at the USPTO. Copies of this document are therefore not believed to be required with submission of the IDS.

"RSS Definition" Wikipedia.com, retrieved May 1, 2008. This document is cited in U.S. Appl. No. 10/735,087 and is available at the USPTO. Copies of this document are therefore not believed to be required with submission of the IDS.

"Weblog Definition" Dictionary.com, retrieved May 1, 2008. This document is cited in U.S. Appl. No. 10/735,087 and is available at the USPTO. Copies of this document are therefore not believed to be required with submission of the IDS.

Tari, Zahir and Chan, Shun Wu, "A Role-based access control for Intranet security". Sep. 1997, pp. 24-34.

Final Office Action dated Nov. 25, 2008 in related U.S. Appl. No. 10/735,087 entitled "Method for Tracking the Status of Workflow Using Weblogs".

Laplante, Alice, "Taligent Electronic Bulletin Board is a Workhorse", InfoWorld, vol. 15, No. 19, May 10, 1993. This document is cited in U.S. Appl. No. 10/735,087 and is available at the USPTO. Copies of this document are therefore not believed to be required with submission of the IDS.

"Teamware Flow 3.1 User's Guide", TeamWare Group, Apr. 2000. This document is cited in U.S. Appl. No. 10/735,087 and is available at the USPTO. Copies of this document are therefore not believed to be required with submission of the IDS.

"ActionWorkflow Enterprise Series 3.0 Process Builder User's Guide", Action Technologies Inc., 1996. This document s cited in U.S. Appl. No. 10/735,087 and is available at the USPTO. Copies of this document are therefore not believed to be required with submission of the IDS.

Non-Final Office Action dated May 14, 2009 in related U.S. Appl. No. 10/735,087 entitled "Method for Tracking the Status of Workflow Using Weblogs".

Udell, Jon, "Internet Group for Scientific Collaboration", 2000. This document is cited in U.S. Appl. No. 10/735,087 and is available at the USPTO. Copies of this document are therefore not believed to be required with submission of the IDS.

Udell, Jon, "Telling a Story: The Weblog as a Project Management Tool", May 24, 2001, 6 pages.

Udell, Jon, "Publishing a Project Weblog", InfoWorld, Mar. 28, 2003, 3 pages.

McGee, "Weblogs and Knowledge Management, Part 2", McGee's Musings, May 27, 2003, 5 pages.

Diehl, Mike, "Mike Diehl's Weblog: Blogging for Project Management", Nov. 28, 2003, 1 page.

Callaghan, Dennis, "IBM Previews Blogging Tool; IBM is Throwing More Weight . . . ", eWeek, vol. 22, No. 28, Jul. 18, 2005, 1 page.

Rath, Doug, "Objects Ease Workflow: A Closer Look at Tempest", http://www.windley.com/2003/06/04, Jun. 4, 2003, 2 pages.

(56) References Cited

OTHER PUBLICATIONS

Windley, Phillip J., "Blogs for Project Management", http://www.windley.com/2003/06/04, Jun. 4, 2003, 2 pages.
"Using Weblogs to Manage IT", Jun. 3, 2003, 2 pages.
"Blogs for IT Management—Follow-Up", Jun. 6, 2003, 2 pages.
"Collaborative Document Management by Interwoven and iManage", eContent Xtra, 1 page.
Final Office Action dated Mar. 26, 2010 in related U.S. Appl. No. 10/735,087 entitled "Method for Tracking the Status of Workflow Using Weblogs".
Pyron et al., "Special Edition: Using Microsoft Project 2000", Que, ISBN 9780789722539, Oct. 7, 2000, 5 pages.
"Web Crossing Inc. Release New Weblog Plug-In", Business Wire, Sep. 3, 2003, 3 pages.
Lindahl, Charlie et al., "Weblogs: Simplifying Web Publishing", Computer, Nov. 2003, 3 pages.
Stone, Biz, "Blogging: Genius Strategies for Instant Web Connect", New Riders, ISBN: 0735712999, Sep. 11, 2002, 120 pages.
Doctorow, Cory et al., "Essential Blogging", O'Riley, ISBN: 0596003889, Sep. 2002, 9 pages.
Landon, Deb et al., "Deploying Lotus Sametime on the IBM eserver iSeries Server", IBM Redbooks, Jun. 2002, 134 pages.
Non-Final Office Action dated Jul. 27, 2010 in related U.S. Appl. No. 10/735,087 entitled "Method for Tracking the Status of Workflow Using Weblogs".
Paquet, Sebastien et al., "A Topic Sharing Infrastructure Network for Weblog Networks", Second Annual Conference on Communication Networks and Services Research, 2004, 4 pages.
Saunders, Christopher, "Merging IM with Blogging", InstantMessagingPlanet, Jul. 3, 2003, 5 pages.
Final Office Action dated Feb. 28, 2011 in related U.S. Appl. No. 10/735,087 entitled "Method for Tracking the Status of Workflow Using Weblogs".

"Security for Microsoft Project Central (Microsoft Project 2000)", Microsoft TechNet, 2000, 18 pages.
Hao et al., "Visualization of Directed Associations in E-Commerce Transaction Data", Hewlett Packard Research Laboratories, Palo-Alto, CA, 7 pages.
bogosphere.us/Feb. 27, 2004, http://www.blogosphere.us, 7 pages.
Non-Final Office Action dated Jul. 27, 2007 in related U.S. Appl. No. 11/117,233 entitled "Visualization of Attributes of Workflow Weblogs".
Non-Final Office Action dated Feb. 5, 2008 in related U.S. Appl. No. 11/117,233 entitled "Visualization of Attributes of Workflow Weblogs".
Non-Final Office Action dated Aug. 20, 2008 in related U.S. Appl. No. 11/117,233 entitled "Visualization of Attributes of Workflow Weblogs".
"Google Blog Search", Google, accessed Aug. 18, 2008, product/service developed circa 2004, 5 pages.
"Technorati", accessed Aug. 18, 2008, Wikipedia, product/service developed circa 2004, 1 page.
Final Office Action dated Apr. 27, 2009 in related U.S. Appl. No. 11/117,233 entitled "Visualization of Attributes of Workflow Weblogs".
Non-Final Office Action dated Dec. 15, 2009 in related U.S. Appl. No. 11/117,233 entitled "Visualization of Attributes of Workflow Weblogs".
Non-Final Office Action dated Jul. 22, 2010 in related U.S. Appl. No. 11/117,233 entitled "Visualization of Attributes of Workflow Weblogs".
Final Office Action dated Apr. 25, 2011 in related U.S. Appl. No. 11/117,233 entitled "Visualization of Attributes of Workflow Weblogs".
Non-Final Office Action dated Sep. 29, 2011 in related U.S. Appl. No. 11/117,233 entitled "Visualization of Attributes of Workflow Weblogs".
Bougettaya et al., "Supporting Dynamic Interactions among Web-Based Information Sources", vol. 12, Issue 5, Sep. 2000, 23 pages.

* cited by examiner

SYSTEM AND METHOD FOR DATA GOVERNANCE

CROSS-REFERENCE TO RELATED APPLICATIONS

This application claims benefit from U.S. Provisional Patent Application No. 61/986,129, filed 30 Apr. 2014, which is hereby incorporated in its entirety by reference.

FIELD OF THE INVENTION

The present invention relates to data access governance.

BACKGROUND OF THE INVENTION

Data access governance is a concept known in the art as a technology for protecting an organization's data from theft, fraud and general misuse.

Data access governance is a technology aimed at protecting the organizational sensitive information from being leaked or abused by both internal and internal threats. Regardless of where it is stored, the information is protected using an organized process. The phases of the process are typically: 1) Discovery—locating the sensitive information, in every form, and on any store; 2) Real-Time Continuous Monitoring—knowing who has accessed what, and, when and where each access occurred; 3) Permissions Management—knowing who has permission to access what and who is not using the granted permissions; 4) Real-Time Data Access Policies—protecting resources by access rules defined based on the user and data context and 5) Compliance—delivering compliance processes such as controls, access reviews, access requests and more.

The data access governance platform commercially available from Whitebox Security Ltd., uses a usage profiler and a compliance profiler in conjunction with a main database (XGS). The usage profiler component is responsible for mining information from the database, such as usage profiles for each user, usage profiles of each resource and many other patterns based on different attributes, monitored, and enriched by the data access governance platform The compliance profiler component searches the governed applications for critical configuration errors, compliance violations, bad practices, and unused resources, and permissions. The data access governance platform uses purposely built application monitors to continuously monitor the activities of users throughout all organizational applications. The data access governance platform constantly analyzes who is accessible to what data, and who actually uses it.

SUMMARY OF THE INVENTION

There is provided, in accordance with a preferred embodiment of the present invention, a system for determining information about a resource implementable on a computing device. The system includes a profiler to generate a targeted subset of users for at least one selected resource according to at least one of: a pre-defined goal and usage statistics of the resource with respect to the goal; an addresser to request from the subset of users information regarding the goal and a collector to collect and analyze the information and to update attributes of the resource according to the information.

Moreover, in accordance with a preferred embodiment of the present invention, the goal is at least one of: owner identification, permission management, data classification, data retention, and suspicious activity.

Further, in accordance with a preferred embodiment of the present invention, the targeted subset of users is based on pre-determined parameters regarding the goal.

Still further, in accordance with a preferred embodiment of the present invention, the information includes actions to be performed on the resource.

Additionally, in accordance with a preferred embodiment of the present invention, the actions are at least one of: classifying the resource, retaining data within the resource, deleting the resource, forfeiting and adding rights to the resource, archiving the resource, and electing owners for the resource.

Moreover, in accordance with a preferred embodiment of the present invention, the collector updates at least one of: a user and a governance database.

There is provided, in accordance with a preferred embodiment of the present invention, a method for determining information about a resource. The method includes generating a targeted subset of users for at least one selected resource according to a pre-defined goal and usage statistics of the resource with respect to the goal, requesting from the subset of users information regarding the goal and collecting and analyzing the information and updating attributes of the resource according to the information.

Moreover, in accordance with a preferred embodiment of the present invention, the goal is at least one of: owner identification, permission management, data classification, data retention, and suspicious activity.

Further, in accordance with a preferred embodiment of the present invention, the targeted subset of users is based on pre-determined parameters regarding the goal.

Still further, in accordance with a preferred embodiment of the present invention, the information includes actions to be performed on the resource.

Additionally, in accordance with a preferred embodiment of the present invention, the actions are at least one of: classifying the resource, retaining data within the resource, deleting the resource, forfeiting and adding rights to the resource, archiving the resource, and electing owners for the resource.

Moreover, in accordance with a preferred embodiment of the present invention, the updating updates at least one of: a user and a governance database.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

It will be appreciated that when implementing data access governance methodologies, certain knowledge of various attributes pertaining to the resource being managed may be beneficial or necessary to the IT and Security Teams or any other administrator managing the data. For example, the knowledge of the owner of a resource may be required in order to delegate authorities for permissions management. For a large unstructured data stores, the task of identifying the rightful owner of a particular resource may potentially be a very difficult and time consuming project.

The knowledge of which types of data are available through which folders and unstructured data stores can help organizations focus their efforts on protection in the right places as well as help evaluate the damage potential in the case of a leak.

The knowledge of which resources are unused and stale from high end storage devices may help an organization save on expensive disk space.

It will be further appreciated that fraud and cyber-attacks may also be more readily prevented by the knowledge that certain activities pertaining to a particular resource may be considered unusual or suspicious. The detection of these behaviors in time could save an organization a great amount of resources and prevent unauthorized intellectual property exposure.

Applicants have realized that some of the current methods of data access governance may benefit dramatically from the participation of the organization's employees in order to speed up deployment processes and increase their accuracy. Processes such as the identification of data owners, permissions management, data classification, and dealing with suspicious abnormal activity which may be potentially and laborious tasks, may benefit dramatically from the involvement of employees as they know best the data they have created and use on a regular basis.

Applicants have also realized that the above mentioned knowledge may be gleaned efficiently using targeted crowd-sourcing methodologies. Crowd sourcing is the practice of obtaining needed information by soliciting contributions from a large crowd of people. Target crowd sourcing follows this practice using a more targeted crowd, selected according to certain criteria. For this invention, the crowd may be considered all employees or users which have access to the business resources of the organization, the target crowd may be a subset of the employees or users which pertain to a required goal and criteria as described in more detail herein below.

As discussed herein above, the data access governance platform commercially available from Whitebox Security Ltd., uses an application monitor (purposely designed software for the real time monitoring of activities and the collection of permissions from a specific application) to monitor activity associated with resources. The monitored activities are then saved on an access governance store. Usage and compliance profilers then analyze the access information saved on the access governance store and create usage patterns based on different types of attributes and by using different proprietary and well-known algorithms. Applicants have realized that information gained from such profilers may allow for a system that may detect users of a resource and use the information to create a "crowd" of users who own, contribute to or use the resource the most regularly according to the statistics. This targeted crowd may then be asked questions about the resource in question such as who owns the data or whether they can shed light on a suspicious activity etc.

For example, a profiler such as that mentioned herein above, might pick up on a user Aaron Smith who has accessed a sensitive folder named "Project X" from a computer he has never used. In order to establish whether a breach of security has occurred, a suitable "crowd" could be generated in order to ask them about this anomaly. The crowd could include the owner of the folder to see if Aaron has a rightful reason to access the file, the creators of the documents within the folder, fellow work colleagues, the main user of the computer from which he accessed the folder etc.

Figure 1A:
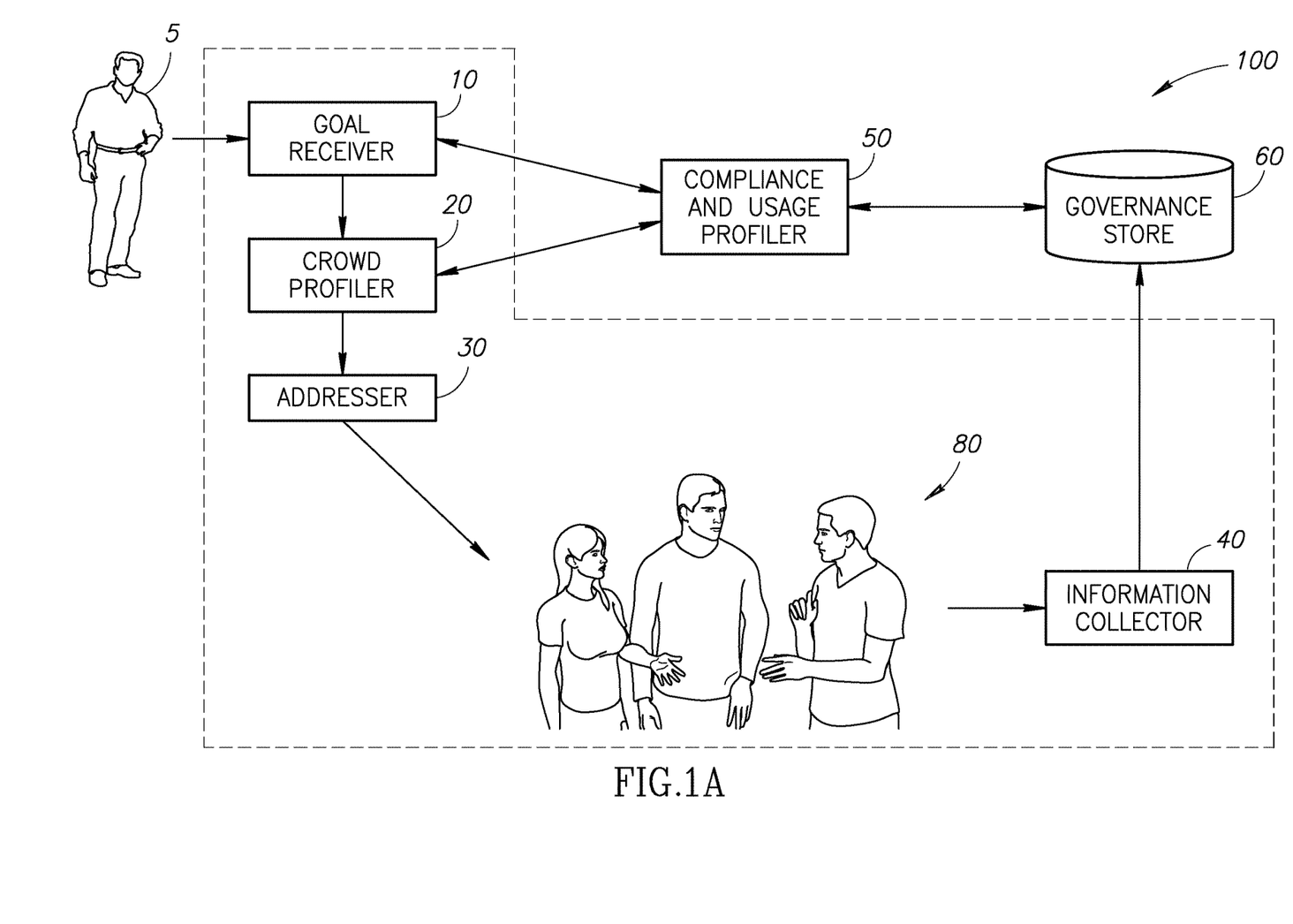
FIGS. 1A and 1B are schematic illustrations of a system for obtaining information about a resource according to user knowledge, constructed and operative in accordance with a preferred embodiment of the present invention.
Figure 1B:
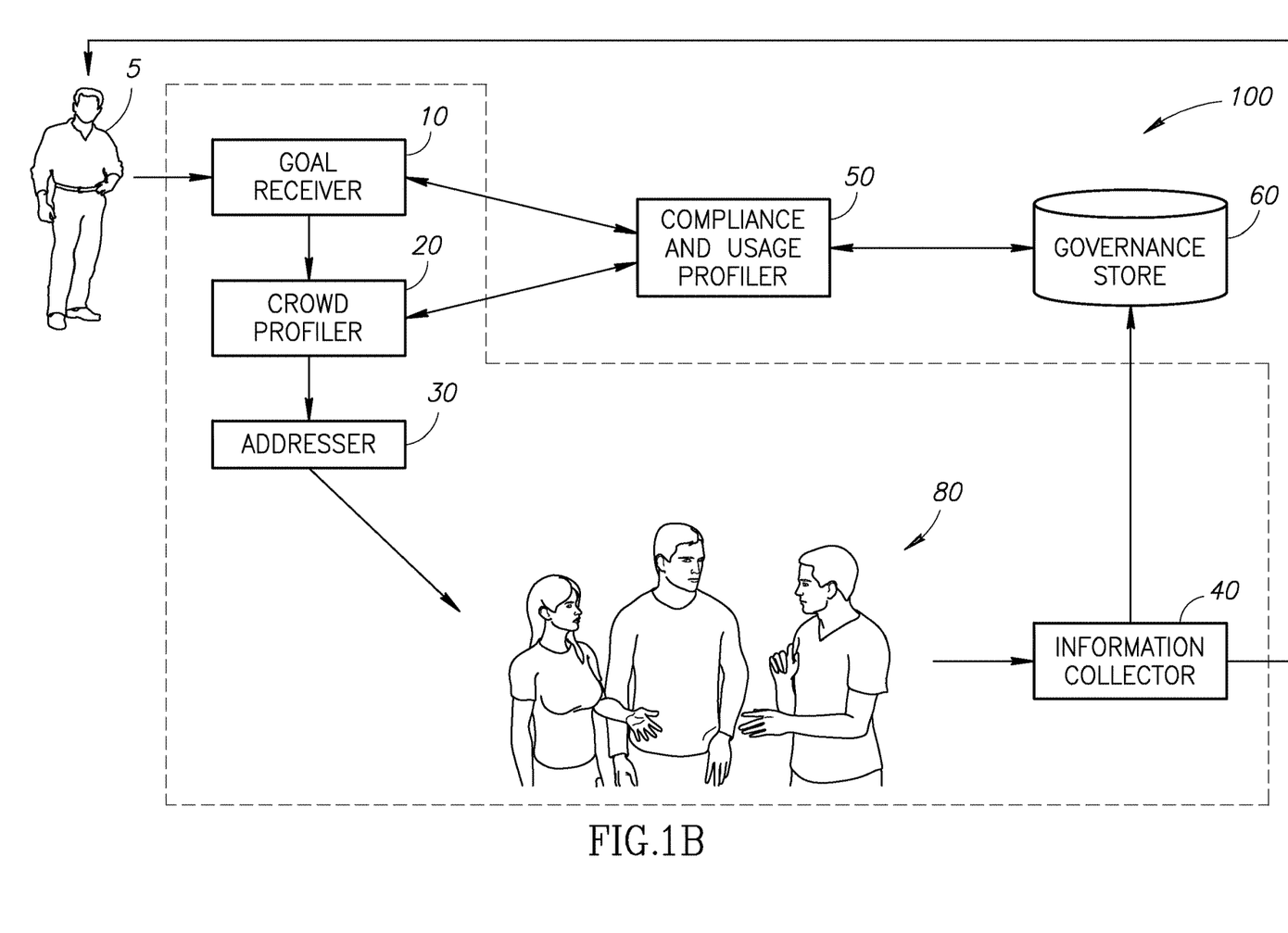

Reference is now made to FIGS. 1A and 1B which illustrate a system 100 for obtaining information about a resource according to user knowledge constructed in accordance with an embodiment of the present invention. System 100 comprises a goal receiver 10, a crowd profiler 20, an addresser 30 and an information collector 40. It will be appreciated that system 100 may be used in conjunction with a governance database 60 which may be further monitored by a compliance and usage profiler 50 (similar to the usage and compliance profilers as described herein above).

It will be appreciated that governance database 60 may be similar to the access governance store of the data access governance platform as described herein above, and may hold information about all the resources for a particular organization as well as different associated attributes such as relevant statistics, ownerships, permissions, etc.

An application or general administrator 5 may use goal receiver 10 to enter his goal, i.e. what he wants out of system 100 such as electing an owner for a folder, etc.

Goal receiver 10 may instruct crowd profiler 20 accordingly. Crowd profiler 20 may retrieve information based on statistics from compliance and usage profiler 50. Crowd profiler 20 may then use this information to generate a group of employees (a crowd) 80 based on parameters such as who has accessed or used the files, how frequent the accesses were, how much of the data within the resource was accessed, etc.

It will be appreciated that the parameters, on which the targeted crowd 80 is generated, may depend on the entered goal such as owner identification, permission management, data classification, suspicious activity etc. It will be further appreciated that crowd profiler 20 may be pre-programmed as to which parameters to use for which goal in order to create the targeted crowd. For example if the goal required is the owner of a particular folder, the targeted crowd created may be based on information regarding who has used the folder and who has contributed to the data within the folder etc.

It will further be appreciated that there may be requirements regarding the size of a targeted crowd. For example a generated targeted crowd of over 100 may be considered too large for a particular goal and may be reduced by introducing additional constraints such as date and time (all users of the resource within the last week etc.), who has accessed/used the data the most or by using priorities. For example, users that have contributed to the data within the folder may have higher priority than employees who have merely looked at the data since they are more likely to know who the resource owner is. It will also be appreciated, that the credibility of the user may also be taken into account, based on decisions he has made in the past.

Addresser 30 may then address crowd 80 generated by crowd profiler 20 and ask them individually, for example who they think the owner of the resource in question is. Since addresser 30 may only address the pre-profiled crowd 80, the answers received have a high probability of being accurate. It will be appreciated that the questions asked by addresser 30 may be pre-determined depending on the entered goal. It will be further appreciated that addresser 30 may communicate with crowd 80 via a suitable interface through which they can add their input and any required decisions. It will be further appreciated that crowd 80 may be invited to use the interface via a suitable mode of communication such as email.

Information collector 40 may collect and analyze the answers from crowd 80 and may determine the lead candidate of the resource. Information collector 40 may then update governance database 60 as to who the owner of the resource is as is shown in FIG. 1A. Administrator 5 may now know who the owner of the resource is and who to consult when for example a user without permission requests to access it, etc.

In an alternative embodiment, depending on the type of goal requested by administrator 5, information collector 40 may update administrator 5 directly as to the information collected from crowd 80 as is illustrated in FIG. 1B.

As discussed herein above, compliance and usage profiler 50 may have knowledge via the statistics, of every user that may have contributed to every file in one of the organization's unstructured data stores. Administrator 5 may instruct crowd profiler 20 via goal receiver 10 to use this information to create a crowd 80 of employees to be addressed by addresser 30 in order to request that the pertinent users classify their created data using data tags. Data tags are short strings that may describe the type of information being held. Addresser 30 may also suggest suitable data tags or may allow the targeted user to add new ones via the interface as described herein above. It will be appreciated that information collector 40 may then analyze this information to be saved back into database 60 to allow a more targeted protection of different types of information through the use of these tags in real-time access policies.

In a different embodiment, since addresser 30 may communicate with a member of crowd 80 via a suitable interface as described herein above, data administrator 5 may instruct crowd profiler 20 (via goal receiver 10) to create a targeted crowd 80 in order to answer a survey regarding their data. For example, administrator 5 may wish to make changes to the data structure and may wish to consult all users about it. It will be further appreciated that in this scenario, crowd 80 may be generated based on the same attributes of the data and data structure in question (users/contributors/owners etc.) as discussed herein above.

Figure 2A:
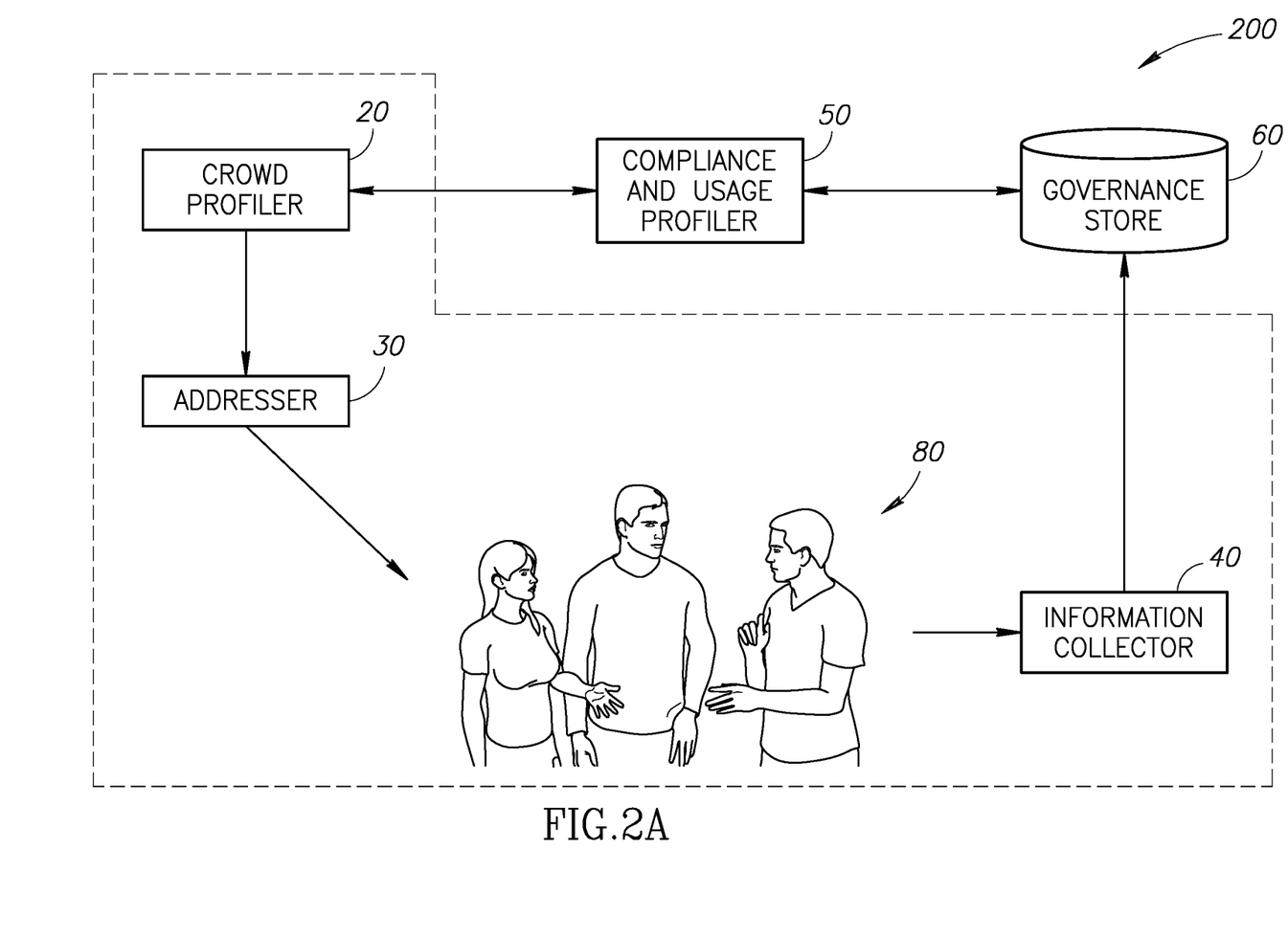
FIGS. 2A and 2B are schematic illustrations of an automatic system for obtaining information about a resource according to user knowledge, constructed and operative in accordance with a preferred embodiment of the present invention.
Figure 2B:
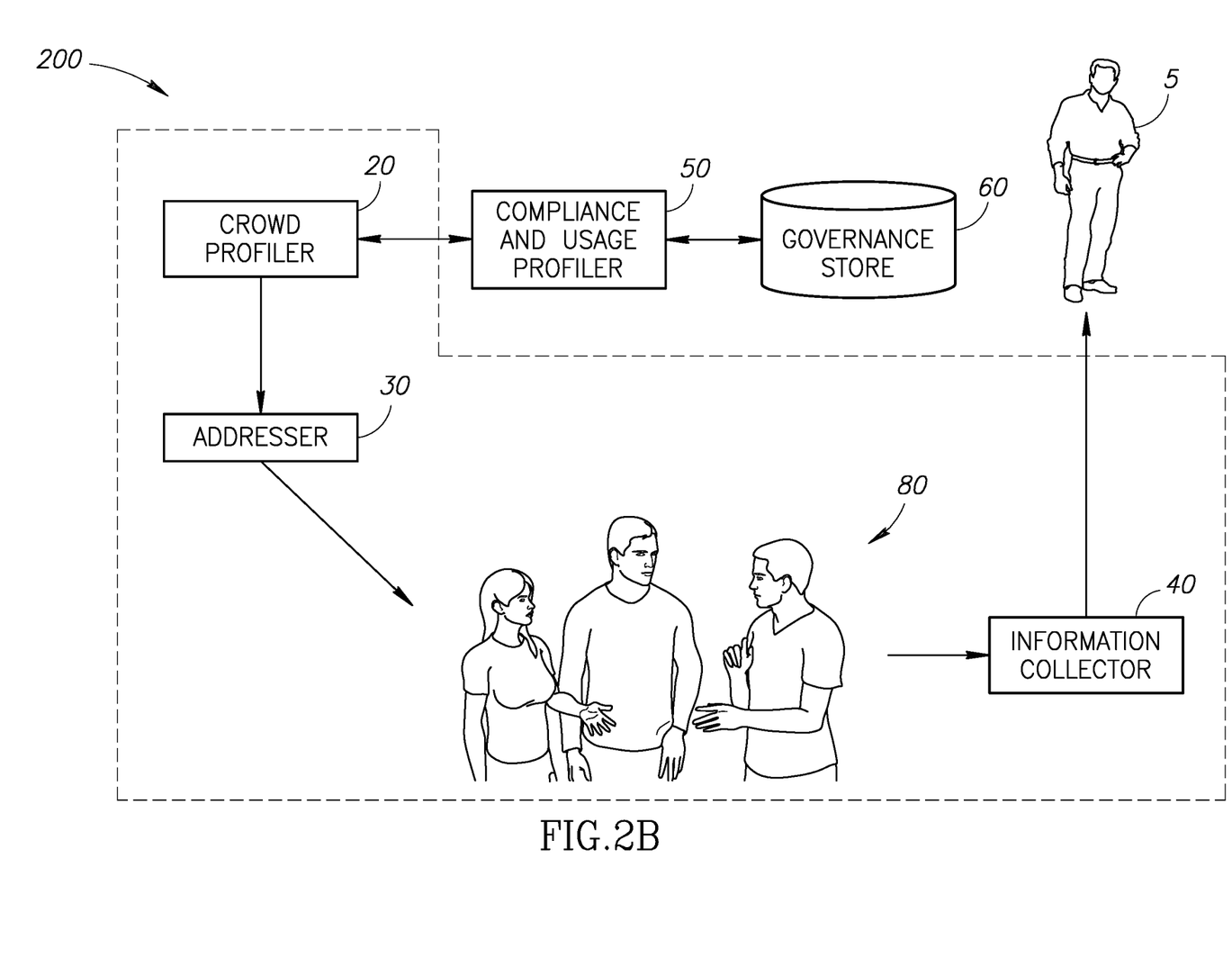

In an alternative embodiment to the present invention, compliance and usage profiler 50 may be pre-programmed to recognize certain activities and to automatically instruct crowd profiler 20 to create a crowd 80 according to a specific goal. Reference is now made to FIGS. 2A and 2B which illustrate a system 200 for automatically obtaining information about a resource according to user knowledge constructed in accordance with an embodiment of the present invention.

For example, compliance and usage profiler 50 may detect a newly created document and may have been pre-programmed to request from crowd profiler 20, each time it detects a newly created document, to create a crowd 80 in order to ask the creator and users to classify the data it contains using data tags as described herein above.

As discussed herein above in relation to system 100, information collector 40 may update either governance database 60 as is illustrated in FIG. 2A or administrator 5 directly as is illustrated in FIG. 2B. For example the goal may be to obtain information concerning suspicious activity that may have been flagged to administrator 5 by compliance and usage profiler 50 during its routine analysis of user access to the database 60. In this scenario, crowd profiler 20 may create a crowd 80 of users based on the user access activity for the suspicious activity as described in the Aaron Smith example herein above such as the creators of the documents within the folder, fellow work colleagues, the main user of the computer from which he accessed the folder etc. Addresser 30 may then query crowd 80 about the suspicious activity in question. Information collector 40 may analyze the information according to pre-determined conditions of what may be considered suspicious. Information collector 40 may then update database 60 accordingly which may (for example) run a process to lock Aaron Smith's account as is illustrated in FIG. 2A or alternatively, information collector 40 may alert and update administrator 5 directly as to the suspicious activity that has been found as is illustrated in FIG. 2B.

Since compliance and usage profiler 50 may also have knowledge of every file that is unused and the exact date it was last used, in the same manner, crowd profiler 20 may use this information to create a crowd 80 of permission owners to addressed by addresser 30 to ask them to agree to the deletion or to the backup of the files as discussed herein above. Other actions may be to classify the files, to retain the data within the files, to forfeit and add rights to the files, archiving the files as well as electing owners for the files. It will be appreciated that in this scenario both systems 100 and 200 may be used with the goal of determining the owners of unused files coming from either administrator 5 or automatically from a pre-programmed compliance and usage profiler 50. This information may be then collected by information collector 40 which may update administrator 5 as described herein above.

It will be appreciated that since compliance and usage profiler 50 may also have knowledge of every permission that is unused and the exact date from which it was dormant. In the same manner, crowd profiler 20 may use this information to create a crowd 80 of owners of each permission to be addressed by addresser 30 to ask them to forfeit their access rights. This information may be then collected by information collector 40 which may update administrator 5 accordingly as described herein above.

It will also be appreciated that systems 100 and 200 may be implemented on a server and accessed by administrator 5 via a suitable interface.

It will be appreciated that both systems 100 and 200 may provide accurate knowledge concerning a resource by targeting employees, users etc. associated with a resource and requesting information about the resource from them. This knowledge may further be used to affect transactions concerning the resource, such as updating permissions and deleting stale or unused data.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

Unless specifically stated otherwise, as apparent from the preceding discussions, it is appreciated that, throughout the specification, discussions utilizing terms such as "processing," "computing," "calculating," "determining," or the like, refer to the action and/or processes of a computer, computing system, or similar electronic computing device that manipulates and/or transforms data represented as physical, such as electronic, quantities within the computing system's registers and/or memories into other data similarly represented as physical quantities within the computing system's memories, registers or other such information storage, transmission or display devices.

Embodiments of the present invention may include apparatus for performing the operations herein. This apparatus may be specially constructed for the desired purposes, or it may comprise a general-purpose computer selectively activated or reconfigured by a computer program stored in the computer. Such a computer program may be stored in a computer readable storage medium, such as, but not limited to, any type of disk, including floppy disks, optical disks, magnetic-optical disks, read-only memories (ROMs), compact disc read-only memories (CD-ROMs), random access memories (RAMs), electrically programmable read-only memories (EPROMs), electrically erasable and programmable read only memories (EEPROMs), magnetic or optical cards, Flash memory, or any other type of media suitable for storing electronic instructions and capable of being coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the invention as described herein.

The invention claimed is:

1. A system implemented on a computing device having a memory and a processor, for determining information about a resource, said system comprising:

a compliance and usage profiler generating statistics of use of resources by users of said resources in an organization, each said resource having a set of use-related attributes;

a crowd profiler configured to generate a targeted subset of users in said organization in response to an administrator instruction to update a selected one of said use-related attributes of at least one selected resource of said organization, said selected attribute having associated statistics of use, said crowd profiler to analyze statistics of use of said at least one selected resource and to generate said targeted subset of users as those users in said organization whose statistics of use match said associated statistics of use;

an addresser configured to question each of said subset of users about a list of owners of selected resource, the addresser to further question each of the subset of users about any known malicious activity associated with the resource; and a collector configured to collect and analyze information received from said subset of users and to update said selected attribute of said resource accordingly.

2. The system according to claim 1 and wherein said collector updates at least one of a user and a governance database.

3. A method, implemented on a computing device having a memory and a processor, for determining information about a resource, said method comprising:

generating statistics of use of resources by users of said resources in an organization, each said resource having a set of use-related attributes;

generating a targeted subset of users in said organization in response to an administrator instruction to update a selected one of said use-related attributes of at least one selected resource of said organization, said selected attribute having associated statistics of use;

analyzing statistics of use of said at least one selected resource;

generating said targeted subset of users as those users in said organization whose statistics of use match said associated statistics of use; questioning each of said subset of users about a list of owners of selected resource and about any known malicious activity associated with the resource;

and collecting and analyzing information received from said subset of users and updating said selected attribute of said resource accordingly.

4. The method according to claim 3 and wherein said updating updates at least one of: a user and a governance database.

* * * * *